(12) United States Patent
Xu et al.

(10) Patent No.: US 11,812,396 B2
(45) Date of Patent: *Nov. 7, 2023

(54) SYNCHRONIZATION CONTROL FOR PACKET DATA CONVERGENCE PROTOCOL (PDCP) DUPLICATE TRANSMISSIONS

(71) Applicant: Apple Inc., Cupertino, CA (US)

(72) Inventors: Fangli Xu, Beijing (CN); Haijing Hu, Beijing (CN); Dawei Zhang, Saratoga, CA (US); Longda Xing, San Jose, CA (US); Murtaza A. Shikari, Mountain View, CA (US); Sethuraman Gurumoorthy, San Jose, CA (US); Sree Ram Kodali, Sunnyvale, CA (US); Srinivasan Nimmala, San Jose, CA (US); Srirang A. Lovlekar, Cupertino, CA (US); Xu Ou, San Jose, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,154

(22) Filed: Jul. 27, 2022

(65) Prior Publication Data

US 2022/0369248 A1    Nov. 17, 2022

Related U.S. Application Data

(63) Continuation of application No. 17/051,383, filed as application No. PCT/CN2018/086339 on May 10, 2018.

(51) Int. Cl.
*H04W 56/00*    (2009.01)
*H04L 1/1829*    (2023.01)
*H04L 1/1867*    (2023.01)

(52) U.S. Cl.
CPC ............. *H04W 56/00* (2013.01); *H04L 1/189* (2013.01); *H04L 1/1832* (2013.01)

(58) Field of Classification Search
CPC ............. H04W 56/00; H04W 56/0005; H04W 56/001; H04W 56/004; H04W 56/0045;
(Continued)

(56) References Cited

U.S. PATENT DOCUMENTS

| 2003/0048812 A1 | 3/2003 | Gross |
| 2009/0213729 A1 | 8/2009 | Zhang |

(Continued)

FOREIGN PATENT DOCUMENTS

| CN | 102158972 A | 8/2011 |
| CN | 103581257 A | 2/2014 |

(Continued)

OTHER PUBLICATIONS

Office Action for CN Patent Application No. 201880093327.4; dated Jan. 12, 2023.
(Continued)

*Primary Examiner* — Peter Chen
(74) *Attorney, Agent, or Firm* — Kowert, Hood, Munyon, Rankin & Goetzel, P.C.

(57) ABSTRACT

A transmitter (e.g. a packet data convergence protocol, PDCP, in the transmitter), which may be a base station for downlink communications or a user equipment device for uplink communications, may control timing of the delivery of duplicate (same) packets to multiple (e.g. two) wireless links (e.g. radio link control links) for transmission to a receiver, based at least on synchronization information received from the receiver. The duplicate packets may be transmitted over the multiple wireless links to the receiver, which may receive the duplicate packets over the multiple wireless links. The receiver may collect and/or generate synchronization information indicative of the timing or latency between the multiple wireless links, based at least on the respective receive timings of the duplicate packets over the multiple wireless links. The receiver may transmit a
(Continued)

report containing the synchronization information to the transmitter periodically and/or in response to a trigger event.

20 Claims, 5 Drawing Sheets

(58) Field of Classification Search
CPC ........... H04W 56/005; H04W 56/0055; H04W 56/0065; H04W 56/0075; H04W 72/0406; H04W 72/0413; H04W 72/042; H04W 72/1278; H04W 72/1289; H04L 1/08; H04L 1/189; H04L 1/1832; H04L 1/18; H04L 1/1812; H04L 1/1816; H04L 1/1819
See application file for complete search history.

(56) References Cited

U.S. PATENT DOCUMENTS

| | | | |
|---|---|---|---|
| 2017/0041767 A1 | 2/2017 | Vajapeyam | |
| 2018/0324642 A1 | 11/2018 | Yu et al. | |
| 2020/0314862 A1 | 10/2020 | Wu | |

FOREIGN PATENT DOCUMENTS

| | | |
|---|---|---|
| CN | 104168663 | 11/2014 |
| EP | 2234313 | 9/2010 |
| EP | 2234313 A2 | 9/2010 |
| EP | 2388947 A1 | 11/2011 |
| EP | 2485442 A1 | 8/2012 |
| EP | 2557867 | 2/2013 |

OTHER PUBLICATIONS

Secretary of Sa WG2 "Draft Report of Sa W2 meeting #111": 3GPP Sa WG2 meeting #112 S2-153721; Anaheim, California USA; Nov. 16, 2015.
Extended European Search Report for EP Patent Application No. 18918169 .6, dated Nov. 16, 2021.
International Search Report and Written Opinion for Application No. PCT/CN2018/086339, dated Jan. 30, 2019; 9 pages.
Notice of Allowance for Chinese Application for Invention No. 201880093327.4; dated May 29, 2023.
Peng et al. "Research and Implementation of RRC Connection Reconstruction in LTE Terminal"; Journal of Chongqing University of Posts and Telecommunications (Natural Science Edition); vol. 23 No. 3; Jun. 2011.

Carrier Aggregation

Dual Connectivity

SYNCHRONIZATION CONTROL FOR PACKET DATA CONVERGENCE PROTOCOL (PDCP) DUPLICATE TRANSMISSIONS

PRIORITY CLAIM

This application a continuation of U.S. patent application Ser. No. 17/051,383, entitled "Synchronization Control for Packet Data Convergence Protocol (PDCP) Duplicate Transmissions," filed Oct. 28, 2020, which is a national phase entry of PCT Application No. PCT/CN2018/086339, entitled "Synchronization Control for Packet Data Convergence Protocol (PDCP) Duplicate Transmissions," filed May 10, 2018, both of which are hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless communications, and more particularly to synchronization control for PDCP duplicate packet transmission during wireless communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Additionally, there exist numerous other different wireless communication technologies and standards. Some examples of wireless communication standards in addition to those mentioned above include GSM, UMTS (WCDMA, TDS-CDMA), LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH, etc.

The radio protocol stack for certain wireless communications standards (e.g. LTE and/or NR) contains multiple layers including PDCP, Radio Link Control (RLC), Media Access Control (MAC), and physical layer (PHY). The PDCP layer provides transport for user payload, such as Internet Protocol (IP) packets in the user plane and/or control plane data in the control plane, depending on the radio bearer for which it is carrying data. A unit of data specified in PDCP is called a packet data unit (PDU). During operation, the PDCP layer may receive a PDU from lower layers and deliver the PDU as a service data unit (SDU) to the upper layers. The PDCP can perform header compression, decompression, ciphering, deciphering, transfer of user data, and/or the maintenance of sequence numbers for Data Radio Bearers (DRBs). As used herein, "PDCP data PDU" is also simply referred to as "PDU", which is meant to be distinct and different from a "PDCP control PDU" or "control PDU". A PDCP entity of a wireless communication device can communicate PDUs to a peer PDCP entity of another wireless communication device. The PDCP entity may be located in the PDCP layer. Each PDCP entity is associated with a radio bearer, e.g., a DRB, or a Signaling Radio Bearer (SRB). The PDCP entity may be associated with a control plane or a user plane, depending on the radio bearer for which the PDCP entity carries data. Accordingly, a PDCP PDU may be a data PDU or a control PDU. A PDCP data PDU may be used to communicate information including PDCP sequence number (SN), user plane data or control plane data. A PDCP control PDU may be used to communicate information including PDCP status report and header compression control information.

PDCP duplication was introduced in various wireless communication standards to increase data transmission reliability and reduce data transmission latency while also providing a useful mechanism for ultra-reliable and low latency communication (URLLC) service transmissions. PDCP duplication can be applied on the SRB as well as on the DRB. In PDCP duplication, PDUs are essentially duplicated and each duplicate PDU is transmitted over a separate respective radio link control (RLC) resource. When desynchronization between the RLCs carrying duplicated PDUs reaches a certain level, it can lead to invalid data transmission in the late link, wasted radio resource(s) for the transmission in the late link, and/or data loss for the entire link due to the service latency requirement.

Other corresponding issues related to the prior art will become apparent to one skilled in the art after comparing such prior art with the disclosed embodiments as described herein.

SUMMARY OF THE INVENTION

Embodiments are presented herein of, inter alia, methods for synchronization control for transmissions of duplicated data packets, e.g. packet data convergence protocol (PDCP) duplicate transmissions during wireless communications, e.g. on packet data networks using a PDCP layer during such communications, and of devices that implement the methods. Embodiments are further presented herein for synchronization control for duplicated data packet transmissions in wireless communication systems containing user equipment (UE) devices and base stations communicating with each other within the wireless communication systems.

In various embodiments, synchronization control for transmission of duplicate packets may be implemented for bearers transmitted via multiple links (e.g. via two links) but with central re-ordering functionality in PDCP, for duplicated and split bearers. In this manner, the transmission latency between the multiple links, e.g. links carrying the same duplicate packet, may be controlled. The control may be achieved through a mechanism implemented on both the transmitter (TX) side and the receiver (RX) side. On the TX side, the PDCP may control the delivery timing of the same packet (i.e. duplicate packets representative of the same packet with respect to the content of the packet) to two radio link control resources (RLCs). For example, the PDCP may deliver the duplicate packets to the multiple (e.g. two) RLCs at the same time or within a specified time window or within a time period of specified duration. Otherwise, the PDCP may only transmit the packet via the early RLC. On the RX side, the PDCP may report synchronization information to the TX side. For example, the PDCP may measure the time difference between receptions of the same packet (duplicate packets having the same SN) from a first RLC and a second RLC, and may transmit this information to the TX side.

Pursuant to the above, for DL transmissions, a first device (e.g. a user equipment device, UE) may report the synchronization information to the network (e.g. to a base station) in the form of a synchronization report. The UE may transmit the report in a PDCP control PDU, in an RLC control PDU, in a MAC CE, or via RRC signaling. The report may include a specified (e.g. maximum) timing difference or latency between multiple (e.g. two links) carrying the duplicate packets, and the PDCP sequence number (SN) of the corresponding packet for which the measurement or timing information for the multiple links (or RLCs) was obtained. The report may also include an average timing difference or average latency between the multiple RLCs, and the PDCP SNs of the corresponding packets for which the measurements of timing/latency for the multiple links were obtained to determine the average timing difference/latency. The report may be transmitted periodically or based on a trigger event, e.g. based on reception of a duplicated packet outside of the receive window, and/or the reception time difference between an early RLC and a late RLC exceeding a specified threshold, e.g. exceeding a specified time duration.

Further pursuant to the above, an apparatus may include a processing element that may cause a device to receive a report from a second device, with the report including synchronization information corresponding to a timing between multiple wireless links, each wireless link used to transmit packets that are duplicates of packets transmitted using the other wireless links. The packets transmitted on/over a given wireless link may be differentiated from each other by sequence numbers (or packet numbers), e.g. PDCP SNs, within the packet data stream, and a packet having a specific SN (being representative of a same packet) may be thereby transmitted over multiple wireless links for packet duplication. The processing element may cause the device to control timing of delivery of duplicate packets to the multiple wireless links for transmission to the second device, based at least on the synchronization information, and transmit the duplicate packets over the multiple wireless links to the second device.

Further pursuant to the above, an apparatus may include a processing element that may cause a device to receive respective duplicate packets over corresponding multiple wireless links from a second device, generate synchronization information corresponding to a timing between the multiple wireless links, based at least on respective receive timings of the respective duplicate packets, and transmit the synchronization information to the second device, with the synchronization information affecting a timing of delivery of future respective duplicate packets to the multiple wireless links for transmission to the device from the second device. The multiple wireless links may be used in a carrier aggregation mode of operation or a dual connectivity mode of operation. The synchronization information may be transmitted by the device periodically or triggered by a triggered event.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
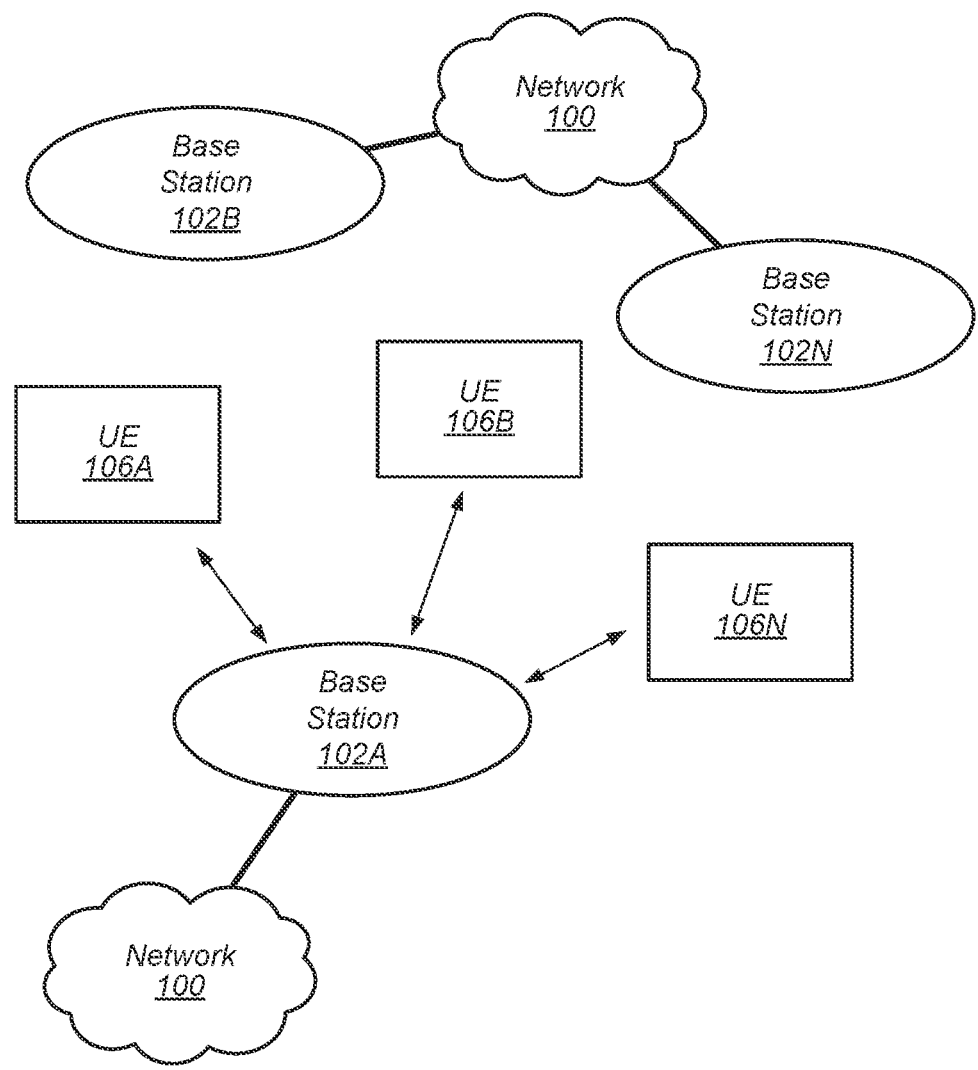
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

ACK: Acknowledge(ment)
AP: Access Point
BS: Base Station
BSR: Buffer Size Report
CA: Carrier Aggregation CE: Control Element
CO: Compressed
CPU: Central Processing Unit
DC: Dual Connectivity
DL: Downlink (from BS to UE)
DRB: Data Radio Bearer
DYN: Dynamic
ESR: Extended Service Request
FDD: Frequency Division Duplexing
FT: Frame Type
FTP: File Transfer Protocol
GPRS: General Packet Radio Service
GSM: Global System for Mobile Communication
IP: Internet Protocol
IR: Initialization and Refresh
IR-DYN: Initialization and Refresh Dynamic
LAN: Local Area Network
LCH: Logic Channel
LTE: Long Term Evolution
MAC: Media Access Control
MCG: Master Cell Group
NACK: Negative Acknowledge(ment)
NAS: Non-Access Stratum
PDCP: Packet Data Convergence Protocol
PDN: Packet Data Network
PDU: Protocol Data Unit
PT: Payload Type
RAT: Radio Access Technology
RB: Radio Bearer
RF: Radio Frequency
RLC: Radio Link Control
ROHC: Robust Header Compression
RRC: Radio Resource Control
RTP: Real-time Transport Protocol
RX: Reception/Receive
SCG: Slave Cell Group
SN: Sequence Number
SRB: Signal Radio Bearer
TCP: Transmission Control Protocol
TDD: Time Division Duplexing
TX: Transmission/Transmit
UDP: User Datagram Protocol
UE: User Equipment
UL: Uplink (from UE to BS)
UMTS: Universal Mobile Telecommunication System
URLLC: Ultra-Reliable and Low Latency Communications
VoLTE: Voice Over LTE
Wi-Fi: Wireless Local Area Network (WLAN) RAT based on the Institute of Electrical and Electronics Engineers' (IEEE) 802.11 standards
WLAN: Wireless LAN

TERMS

The following is a glossary of terms that may appear in the present application: Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable. UE devices that perform wireless communications are also referred to as wireless communication devices. Examples of UE devices include mobile telephones or smart phones (e.g., iPhone™, Android™-based phones) and tablet computers such as iPad™, Samsung Galaxy™, etc., portable gaming devices (e.g., Nintendo DS™, PlayStation Portable™, Gameboy Advanc™, iPod™), laptops, wearable devices (e.g. Apple Watch™ Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is easily transported by a user.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, various analog and/or digital circuitry, circuits such as an ASIC (Application Specific Integrated Circuit), programmable hardware elements such as a field programmable gate array (FPGA), as well as any of various combinations of the above.

Wireless Device (or Wireless Communication Device)—any of various types of computer systems devices which performs wireless communications using WLAN communications, SRAT communications, cellular communications, Wi-Fi communications and the like. As used herein, the term "wireless device" or "wireless communication device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
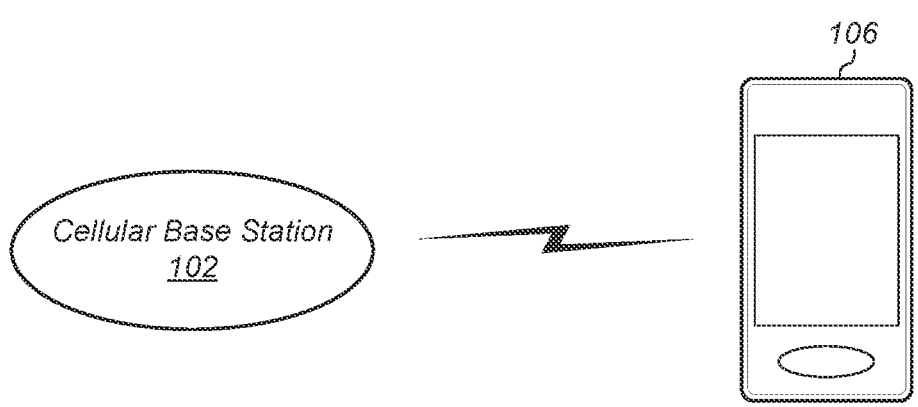
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network. It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120-degree beam-width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads).

The base station 102 and the user devices may be configured to communicate over the transmission medium using any of various radio access technologies (RATs), also referred to as wireless communication technologies, or telecommunication standards, such as GSM, UMTS (WCDMA), 5G-NR (New Radio, or NR for short), LTE, LTE-Advanced (LTE-A), 3GPP2 CDMA2000 (e.g., 1×RTT, 1×EV-DO, HRPD, eHRPD), Wi-Fi, WiMAX etc. In some embodiments, the base station 102 implements at least part of a synchronization control for duplicated data packet transmissions as described herein, e.g. for wireless communications through LTE, NR, or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards), and/or other cellular communication standard (e.g. NR). In some embodiments, the UE 106 may be configured to communicate with base station 102 using synchronization control for duplicated data packet transmission as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a handheld device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. In some embodiments, the UE 106 may include any processing element(s) that perform any of the method embodiments described herein. For example, the UE 106 may include any one or more of a processor, FPGA, custom circuitry, application specific integrated circuit and/or system on a chip interoperating to execute/perform any of the method embodiments described herein. The UE 106 may be configured to communicate using any of multiple wireless communication protocols. For example, the UE 106 may be configured to communicate using two or more of CDMA2000, LTE, LTE-A, WLAN, 5G-NR (NR), or GNSS. Other combinations of wireless communication standards are also possible.

The UE 106 may include one or more antennas for communicating using the one or more wireless communication protocols mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and BLUETOOTH™. Other configurations are also possible.

Figure 3:
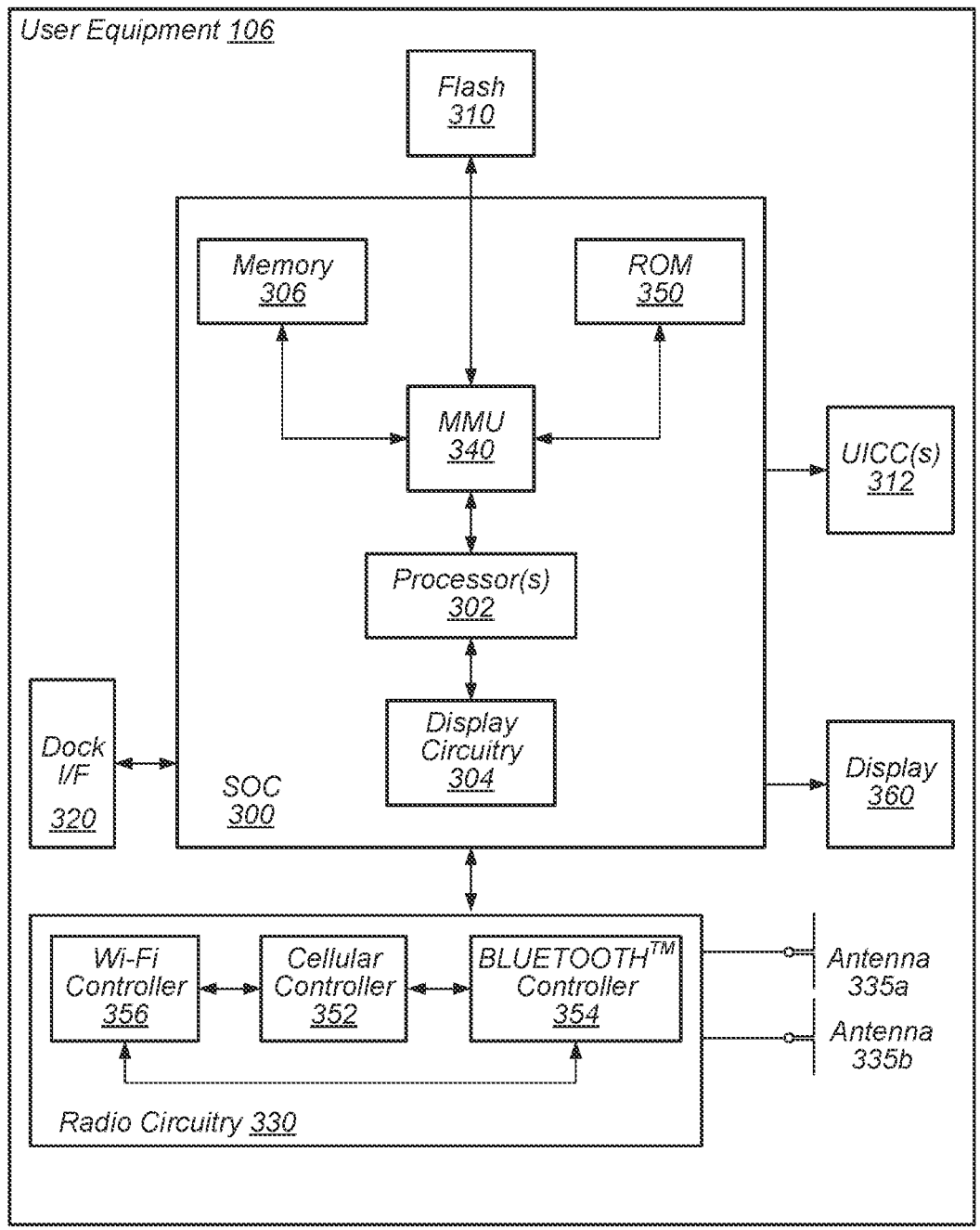
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio (circuitry) 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (or radio circuitry) 330 (e.g., for LTE, LTE-A, 5G-NR, CDMA2000, BLUETOOTH™, Wi-Fi, GPS, etc.). The UE device 106 may include at least one antenna (e.g. 335a), and possibly multiple antennas (e.g. illustrated as antennas 335a and 335b), for performing wireless communication with base stations and/or other devices. Antennas 335a and 335b are shown by way of example, and UE device 106 may include fewer or more antennas. Overall, the one or more antennas (including 335a and 335b) are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for synchronization control of duplicate data packet, or packet data unit transmissions for wireless communications. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporates synchronization control of duplicated data packet transmissions according to various embodiments disclosed herein. Specifically, processor(s) 302 may be coupled to and/or may interoperate with other components as shown in FIG. 3 to facilitate UE 106 performing header compression with accurate synchronization between compressor state and decompressor state. Processor(s) 302 may also implement various other applications and/or end-user applications running on UE 106.

In some embodiments, radio (circuitry) 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments may have fewer or more similar controllers for various different RATs that may be implemented in UE device 106, and radio circuitry 330 may be implemented as any number of different controllers for facilitating wireless communications according to various respective wireless standards, for example as shown in FIG. 3, or in a single controller, or any combination as desired.

Figure 4:
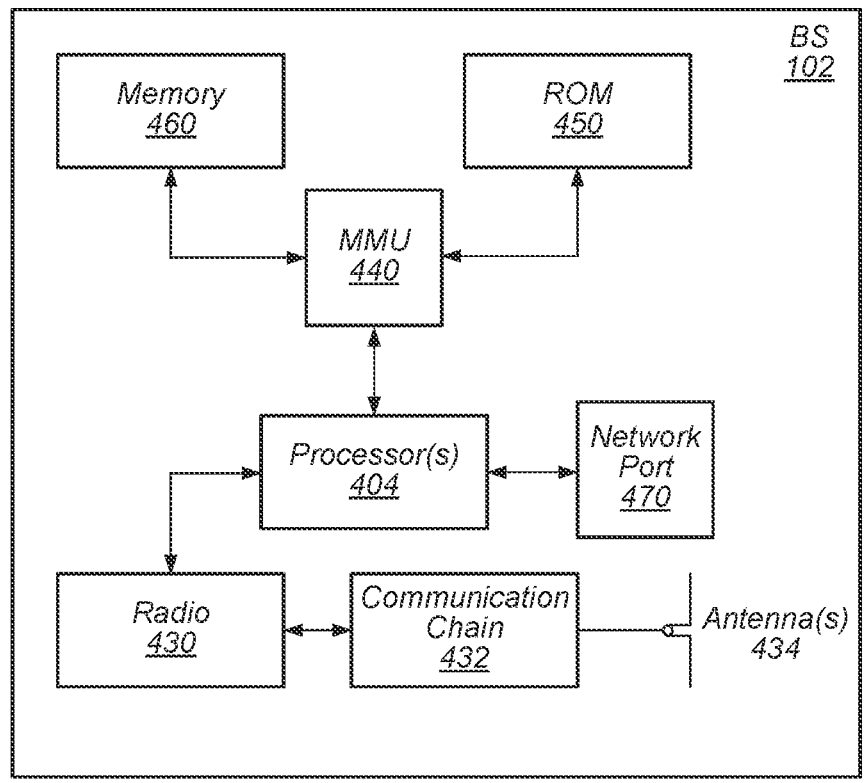
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna, and possibly multiple antennas. The one or more antennas are collectively referred to as antenna(s) 434. Antenna(s) 434 may be configured to operate as a wireless transceiver and may be further configured to communicate with UE devices 106 via radio 430. The antenna(s) 434 communicate with the radio 430 via communication chain 432. Communication chain 432 may be a receive chain, a transmit chain or both. The radio (circuitry) 430 may be designed to communicate via various wireless telecommunication standards, including, but not limited to, LTE, LTE-A, 5G-NR, WCDMA, CDMA2000, etc. The processor(s) 404 of the base station 102 may be configured to implement part or all of the methods described herein for base station 102 to perform at least part of synchronization control of duplicated data packet transmissions, e.g. PDCP duplicate transmissions, e.g., by executing program instructions stored on a memory medium (e.g., a non-transitory computer-readable memory medium). Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for providing more accurate UL grants to mobile devices.

Packet Data Convergence Protocol (PDCP) and Duplicate Packet Data Unit (PDU) Transmissions As previously mentioned, PDCP duplication was introduced to increase data transmission reliability and reduce data transmission latency while also providing a useful mechanism for ultra-reliable and low latency communication (URLLC) service transmissions. The main services and functions of the PDCP sublayer for the user plane include sequence numbering (SN), header compression and decompression, transfer of user data, reordering and duplicate detection (if in-order delivery to layers above PDCP is required), PDCP PDU routing (in case of split bearers), retransmission of PDCP SDUs, ciphering and deciphering, PDCP SDU discard, PDCP re-establishment and data recovery for RLC, and duplication of PDCP PDUs. PDCP duplication may be applied on a signal radio bearer (SRB) as well as on a data radio bearer (DRB). Duplication applied on a DRB is supported for both dual connectivity (DC) and carrier aggregation (CA), while duplication applied on a SRB is supported for DC.

Dual connectivity (DC), e.g. in LTE or NR networks, may significantly improve per-user throughput and mobility robustness by allowing UEs to be connected simultaneously to a master cell group (MCG) and secondary cell group (SCG) via a master base station (e.g., master eNB) and a secondary base station, (e.g. secondary eNB), respectively. The increase in per-user throughput is achieved by aggregating radio resources from at least two base stations (e.g. at least two eNBs). Furthermore, dual connectivity also helps in load balancing between the MCG and the SCG.

Carrier aggregation (CA) refers to two or more component carriers (CCs) being aggregated in order to support wider transmission bandwidths, e.g. bandwidths of up to 100 MHz. A UE may simultaneously receive and/or transmit on one CC or multiple CCs depending on the capabilities of the UE. With CA configured, the UE may maintain one RRC connection with the network. The serving cell managing the RRC connection of the UE is referred to as the Primary Cell (PCell). The PCell together with the Secondary Cell(s) (SCells) may form a set of serving cells. Correspondingly, the carrier used for communications served by the PCell is referred to as the Primary Component Carrier (PCC), and the carrier(s) used for communications served by the SCell(s) are referred to as Secondary Component Carrier(s) (SCCs).

Radio link control (RLC) is a layer 2 protocol and is located on top of the MAC layer and below the PDCP layer. The main tasks of the RLC protocol include transfer of upper layer PDUs, error correction, concatenation, segmentation and reassembly of RLC service data units (SDUs), re-segmentation of RLC data PDUs, reordering of RLC data PDUs, duplicate detection, RLC SDU discard, RLC re-establishment, and protocol error detection and recovery. As used herein, for the sake of convenience, "RLC" is also used to reference an "RLC resource" and "RLC link". In other words, references to RLC and RLCs for the purpose of wireless communication are intended to denote RLC resources/links used for performing the wireless communication. Thus, when referring to RLC resources and/or RLC links for wireless communication, "RLC" is also used as a shortened form of "RLC resource" and "RLC link", and "wireless link" is used to more generally refer to wireless links of which RLCs represent one example.

In the PDCP transmission process, a wireless communication device may perform a sequence numbering operation on the data packets, where a Sequence Number (SN) is included in an SN field of a PDCP header for each PDCP data PDU. Each PDCP entity that carries user plane data may use header compression per radio bearer configured by upper layers to compress the header information included in PDCP SDU (e.g., TCP/IP header). Following security activation (by upper layers), the PDCP entity may also perform ciphering after performing header compression. The 3GPP specification defines a sequence number (SN), a discard timer, and a reordering window for PDCP. According to PDCP, a new sequence number (SN) is assigned to each PDCP Protocol Data Unit (PDU), or in other words to each packet, when that PDU (or "packet") is transmitted. The SN is used to align a sending PDCP entity (or "transmitter") and a receiving PDCP entity (or "receiver"), as will be discussed in further detail below. For example, the PDUs form a data stream, and the sequence numbers may be used to indicate the position of each PDU in the data stream. The SNs assigned to the PDUs allow both the transmitter and the receiver to correctly align each PDU within the data stream. This allows the receiver to receive and correctly decipher the PDUs of the data stream that are transmitted from the transmitter.

The discard timer is used to assign a lifetime for each packet in a transmit queue of a transmitting PDCP entity. In the uplink (UL), the transmitting PDCP entity may be a UE (e.g. UE 106). In the downlink (DL), the transmitting PDCP entity may be a base station (e.g. one of base stations 102A-102N). If more packets are entered into the transmit queue than can be transmitted, the excess packets may get deleted if they are not transmitted before their respective discard timers expire. When packets get discarded due to the discard timer in the transmit queue, gaps are created in the PDCP PDU data stream and the assigned SNs of the transmitted PDUs of the data stream are no longer consecutive. For example, five consecutive PDUs of the data stream may be input to the transmit queue with consecutive sequence numbers 1, 2, 3, 4 and 5. If, for example, the discard timer for the third PDU expires before the third PDU is output from the transmit queue, the third PDU is discarded. Meanwhile, if the first, second, fourth and fifth PDUs are all output from the transmit queue before their respective discard timers expire, four PDUs will be transmitted from the transmitting PDCP entity, the PDUs having SNs 1, 2, 4 and 5, respectively. Therefore, there will be a gap in the sequence numbers (at number 3) and the sequence numbers of the transmitted PDUs will not all be consecutive due to the gap.

The reordering window is part of an algorithm to handle received packets at the receiving PDCP entity even if the SNs of the received packets are not consecutive. For DL, the receiving PDCP entity may be a UE (e.g. UE 106), while for UL, the receiving PDCP entity may be a base station (e.g. one of base stations 102A-102N). The reordering window is used to determine if a received packet is a new packet in the data stream or an out-of-date packet. When a PDU of the data stream is received at the receiving PDCP entity, the reordering window may determine that the received PDU is a new PDU of the data stream if the received PDU has a sequence number which is greater than (but by no more than a specified number, e.g. by no more than 2048) the sequence number of the most recently received new PDU of the data stream. In contrast, when a PDU of the data stream is received at the receiving PDCP entity, the reordering window may determine that the received PDU is an out-of-date PDU of the data stream if the received PDU has a sequence number which is less than (but by no more than a specified number, e.g. by no more than 2047) the sequence number of the most recently received new PDU of the data stream. The received PDU is processed at the receiver based on the determination whether the received PDU is a new data unit or a repeated data unit of the data stream. For example, if it is determined that the received PDU is a repeated PDU of the data stream, the received PDU may be discarded at the receiver. However, if it is determined that the received PDU is a new PDU of the data stream, the received PDU may be stored in PDCP or forwarded to higher layers at the receiver, and may for example be used to decipher the newly received data unit using at least the sequence number of the newly received data unit.

FIGS. 5, 6, 7

Figure 5:
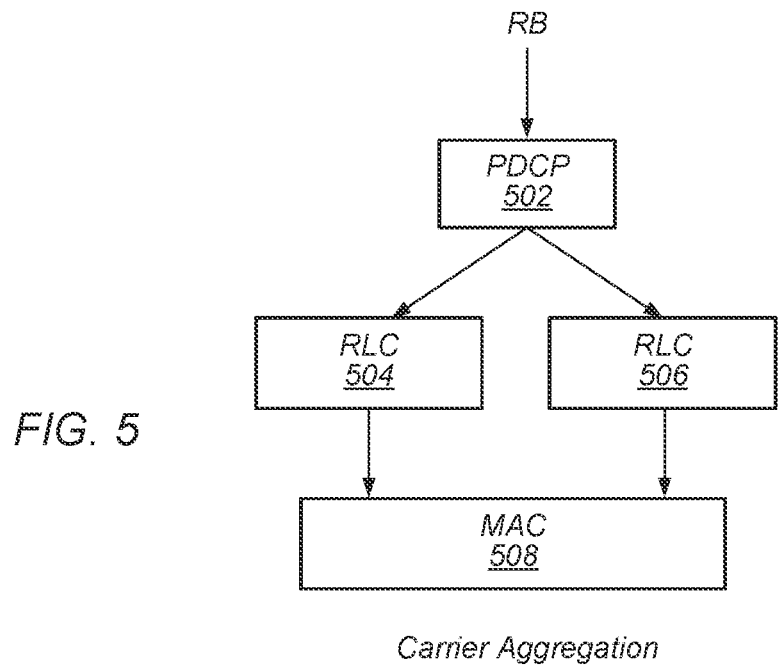
FIG. 5 shows a block diagram illustrating a protocol stack for transmission of duplicated packets over two different radio link resources for carrier aggregation.
Figure 6:
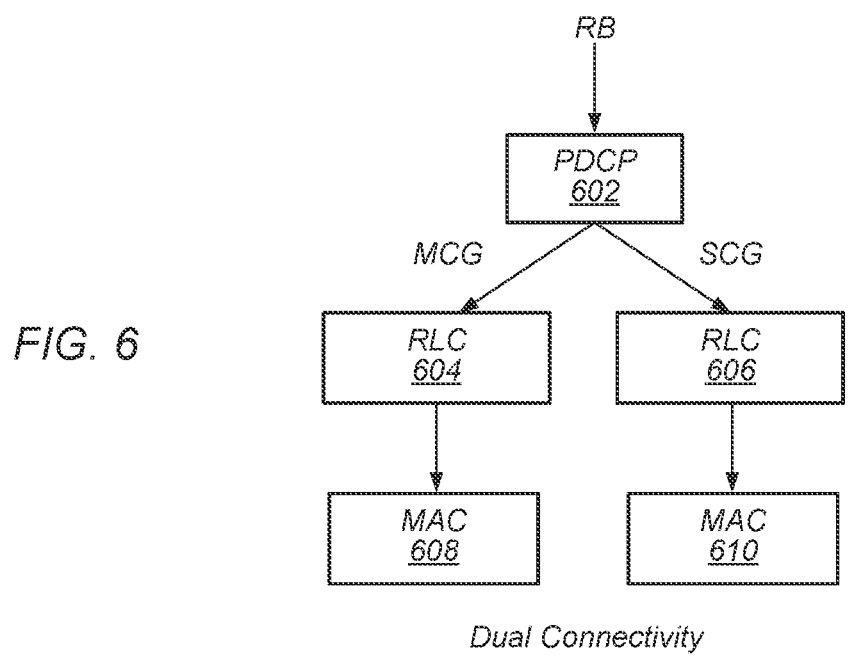
FIG. 6 shows a block diagram illustrating a protocol stack for transmission of duplicated packets over two different radio link resources for dual connectivity.

FIG. 5 shows a block diagram illustrating a protocol stack for transmission of duplicated packets over two different RLCs for CA. FIG. 6 shows a block diagram illustrating a protocol stack for transmission of duplicated packets over two different RLCs for DC. As shown in FIGS. 5 and 6, for each radio bearer (RB), there is one corresponding PDCP entity and two corresponding RLC entities in the protocol stack. A secondary RLC entity and a secondary logic channel (LCH) may be configured for duplicated packet transmission, e.g. for the transmission of duplicated packets representative of the same packet over multiple RLCs. The duplication is performed in the PDCP layer, where the PDCP entity submits the same PDCP PDUs to both RLC entities, e.g. to a primary RLC entity and to a secondary RLC entity. The two independent links are then used for transmission of the duplicate packets. Transmission of the same PDCP PDUs via the two links is not to be mapped on the same carrier. Furthermore, in CA, logical channel mapping restrictions are introduced.

Specifically, as shown in FIG. 5 for CA, RLC 504 and RLC 506 may each receive a duplicate (copy) of the same packet from PDCP 502, with a single corresponding MAC 508 for both RLC 504 and RLC 506. As shown in FIG. 6 for DC, RLC 604 and RLC 606 may each receive a duplicate (copy) of the same packet from PDCP 602, with a respective corresponding MAC 608 for the MCG (associated with RLC 604), and a respective corresponding MAC 610 for the SCG (associated with RLC 606).

Figure 7:
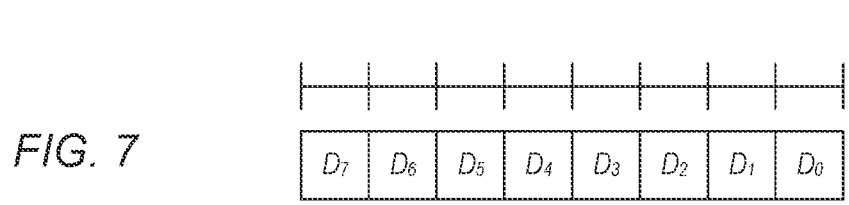
FIG. 7 shows an exemplary media access control (MAC) control element (CE) used for activating/deactivating packet duplication on corresponding data radio bearers (DRBs)

For SRB, packet duplication configuration and activation/deactivation may be controlled by radio resource control (RRC). For DRB, configuration may be controlled by RRC, while activation/deactivation may be controlled via a MAC CE. The packet duplication itself may be performed by the PDCP layer. The duplication configuration controlled by the RRC may include uplink duplication configuration at the DRB level, primary link configuration for the duplicated DRB (e.g. for the primary RLC entity and the primary logic channel, LCH), and LCH and carrier mapping restriction configuration for CA duplication. The activation/deactivation control by the MAC CE may include UL duplication activation/deactivation at the DRB level. FIG. 7 shows an exemplary MAC CE used for activating/deactivating packet duplication on corresponding DRBs. As shown in FIG. 7, $D_i$ indicates the duplication activation/deactivation status of DRB i, where i is the ascending order of DRB IDs configured with duplication. For example, $D_2$ indicates the duplication activation/deactivation status of DRB #2, $D_4$ indicates the duplication activation/deactivation status of DRB #4, and so on. In duplication deactivation, the logical channel mapping restrictions may be disabled, and the secondary link may be disabled for new data transmission. The MAC may forward the activation/deactivation command to the PDCP.

Data Receiving (Reception) Operation

The PDCP may perform the reordering and duplication detection of received packets based on the data delivered from the multiple (e.g. two) links carrying the duplicate packets. The reordering and duplication detection may be performed on all received packets within a PDCP reordering window, which may be a PUSH window moving (e.g. advancing) based on new data received in-sequence from a lower layer, and/or based on a T-reordering timer expiry. T-reordering is started based on reception gap detection (as previously described, a given packet in the packet steam/sequence may not have been transmitted or it may have been lost during transmission for some reason), to control the delay of the moving window. Upon T-reordering expiry, the lower edge of the reordering window may be moved to the next gap. When performing packet duplication, if the desynchronization between the two links carrying the duplicate packets reaches a certain level, it may lead to invalid data transmission in the late link, wasted radio resource for the transmission in the late link, and/or data loss for the entire link (i.e. both links considered together) due to the service latency requirement. Therefore, when performing packet duplication, it is desirable to maintain the latency between the two links (e.g. between the two RLCs, and more generally between all links/RLCs carrying duplicate packets) to remain within a certain time period. In other words, it is desirable to maintain a latency between the two links that does not exceed a specified time duration or time duration threshold.

Figure 8:
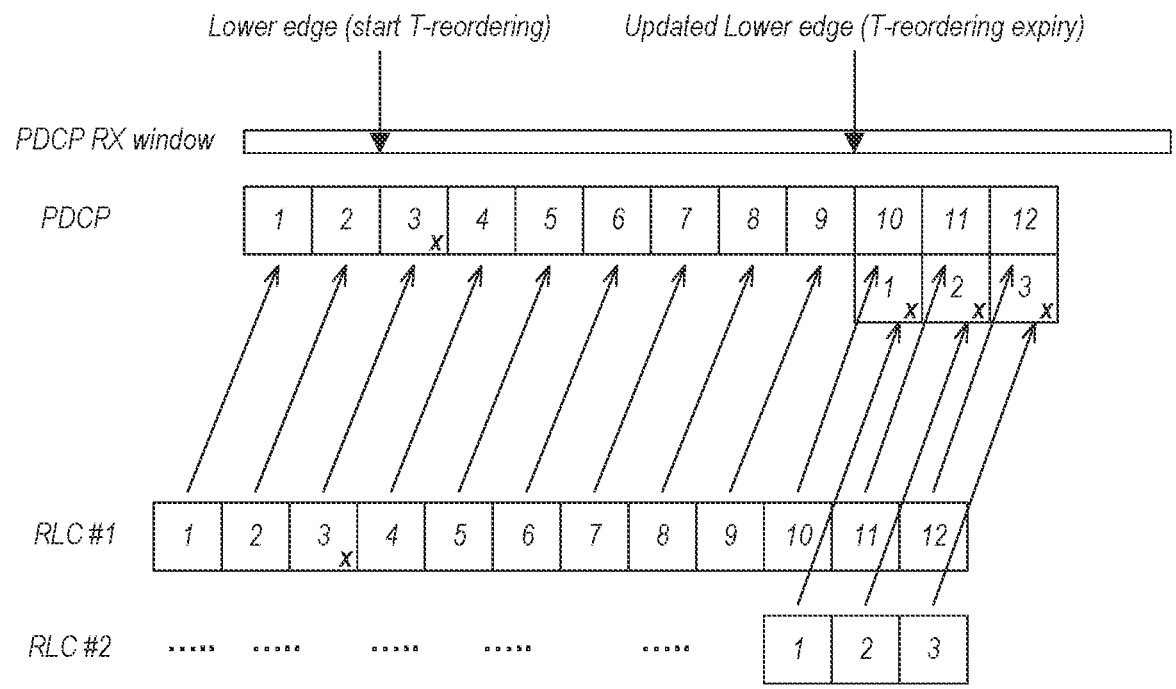
FIG. 8 shows a block diagram illustrating the latency between two radio link resources (RLCs) carrying duplicate packets.

Adverse Effects of Wireless Link Desynchronization During Duplicate Packet Transmission FIG. 8 shows a block diagram illustrating the disadvantages that may be encountered when the latency between two radio link resources (RLCs) carrying duplicate packets is too long. In the example shown in FIG. 8, RLC #2 is delayed with respect to RLC #1, and packet #3 (or sequence number, SN, #3) in RLC #1 is assumed to be lost or simply missing (e.g., as previously discussed above, SN #3 or packet #3 may not reach the receiver via RLC #1 for some reason). The expiry timer for reordering may be started after packet SN #2 has been received at the time packet SN #3 was expected, and the PDCP may wait for packet #3 for the duration specified by the reordering expiry timer. Upon the expiry of the reordering timer, the lower edge of the RX window may have moved to the expected receive time of packet SN #10 in the PDCP layer. As further shown in FIG. 8, packets #1 through #3 are just beginning to arrive to the PDCP layer at that time on RLC #2. Because the lower edge of the RX window has already reached (moved or advanced) to packet #10 in the PDCP layer, packets #1 through #3 arriving on RLC #2 are arriving too late with respect to the packets already received on RLC #1, and therefore packets #1 through #3 arriving on RLC #2 are simply discarded. This represents inefficient transmission of packets SN #1, #2, and #3 on RLC #2. Furthermore, packet SN #3 may therefore be completely lost, because even though packet SN #3 does reach PDCP on RLC #2 (in contrast to packet SN #3 not reaching PDCP on RLC #1), it arrives too late and is thus discarded, resulting in packet SN #3 being lost altogether.

Synchronization Control for Duplication Transmission

Synchronization control for transmission of duplicate packets may be implemented for bearer(s) transmitted via multiple (e.g. two) links but with central re-ordering functionality in PDCP, for duplicated and split bearers. Accordingly, in various embodiments, a mechanism may be implemented to control the transmission latency between multiple (e.g. two) links carrying the same duplicate packets (e.g. duplicate packets having the same or identical content). The control mechanism may be implemented on both the transmitter (TX) side and the receiver (RX) side. On the TX side, the PDCP may control the time to deliver the same packet to multiple (e.g. two) links or RLCs. For example, the PDCP may deliver the same packet (e.g. duplicate packets each having the same or identical content) to the multiple RLCs at the same time or within a time period of specified duration. Otherwise, the PDCP may only transmit the packet via the early link (or RLC). On the RX side, the PDCP may report synchronization information to the TX side, with the synchronization information corresponding to the timing (or latency) between the multiple links (or RLCs) carrying the duplicate packets. For example, the PDCP may measure the time difference between reception of a packet having the same SN on a first link (RLC) and on a second link (RLC), and may transmit this information to the TX side.

Pursuant to the above, for DL transmissions, the UE may report the synchronization information to the network (e.g. to a base station) in the form of a synchronization report. The UE may transmit the report in a PDCP control PDU, in an RLC control PDU, in a MAC CE, or via RRC signaling. The report may include a specified (e.g. maximum) timing difference between the multiple (e.g. two) links carrying the duplicate packets, and the PDCP SN for the corresponding packet, where the timing difference was obtained/measured for reception of the packet having the specific SN. The report may further include an average timing difference between the multiple (e.g. two) links/RLCs carrying the duplicate packets, and the PDCP SNs for the duplicated packets whose reception timing was monitored to obtain/determine the average timing difference. For example, when reception timing of packets having SNs #2, #3, and #4 is tracked on each link of the multiple links, a latency or timing difference between arrivals of the packet on each different link may be obtained for each SN packet, and an average latency/timing difference between the links may be obtained. The average timing difference may then be transmitted along with the SN identifiers #2, #3 and #4 to the transmitter (in this case the network).

The report may be transmitted periodically, or it may be transmitted based on a trigger event, e.g. based on reception of a duplicate packet outside of the RX window, and/or based on the reception time difference between the early link (or RLC) and the late link (or RLC) exceeding a specified threshold, e.g. exceeding a specified time duration.

Exemplary Method for Synchronization Control for Duplicate Packet Transmissions

Figure 9:
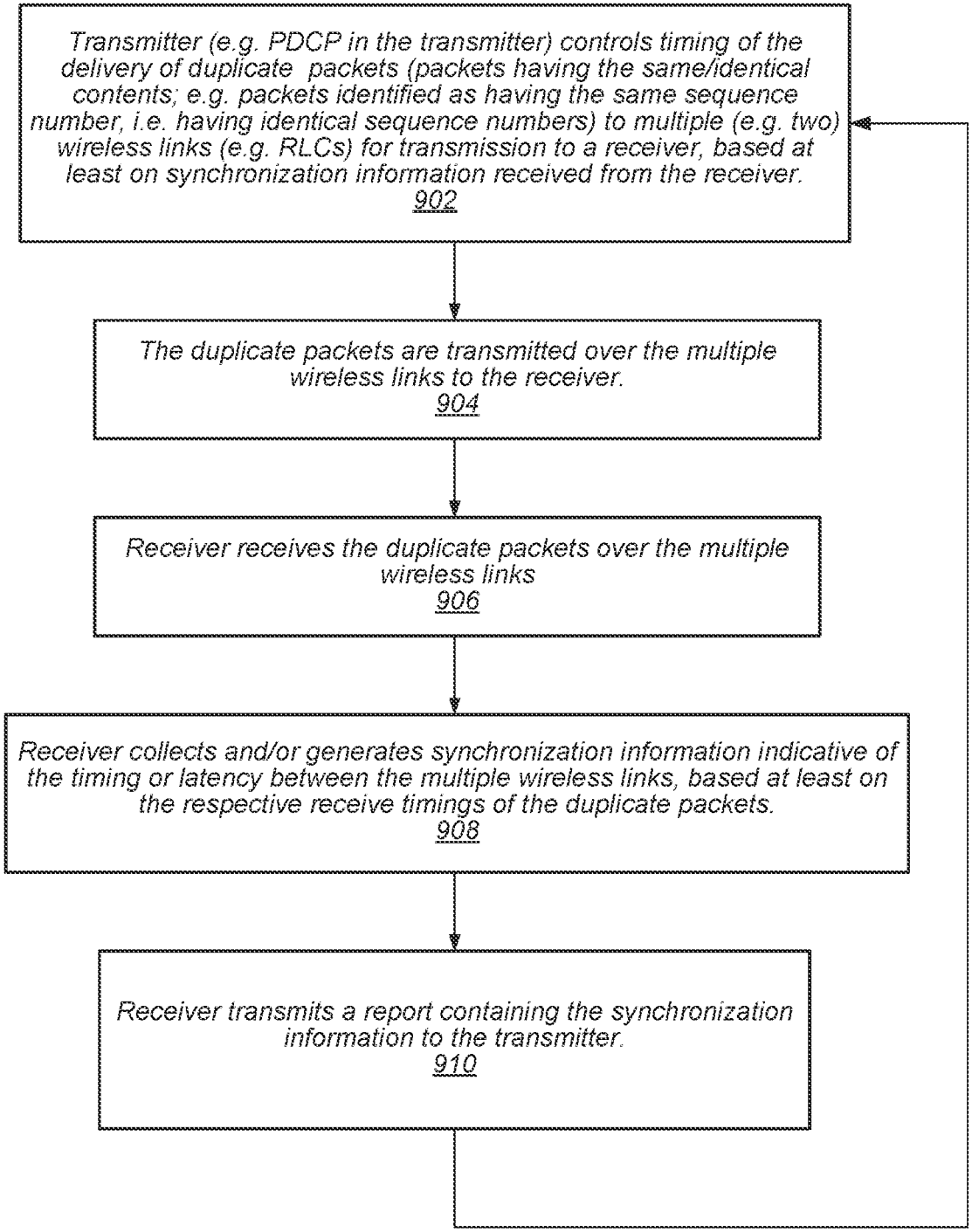
FIG. 9 shows a flow diagram illustrating an exemplary method for synchronization control for duplicated data packet transmissions during wireless communications, according to some embodiments.

FIG. 9 shows a flow diagram illustrating an exemplary method for synchronization control for duplicated data packet transmissions during wireless communications, according to some embodiments. A transmitter (e.g. PDCP layer in the transmitter) which may be a base station for DL communications or a UE for UL communications, may control timing of the delivery of duplicate packets to multiple (e.g. two) wireless links (e.g. RLCs) for transmission to a receiver, based at least on synchronization information received from the receiver (902). There may be a specified number (e.g. two) of duplicate packets representative of the same/identical packet content, with the packets differentiated by assigned SNs, each duplicate packet representative of a same given packet having the same SN. Packets having identical SNs, e.g. identical PDCP SNs, are considered to be duplicate of each other. The duplicate packets may then be transmitted over the multiple wireless links to the receiver (906), which may receive the duplicate packets over the multiple wireless links (906). The receiver may collect and/or generate synchronization information indicative of the timing or latency between the multiple wireless links carrying the duplicate packets, based at least on the respective receive timings of the duplicate packets (908) received over the different wireless links. The receiver may then transmit a report containing the synchronization information to the transmitter (910). As noted above, the receiver may transmit the report periodically, or triggered by a specific event and/or condition.

As indicated by FIG. 9, a method for synchronizing multiple wireless links used for duplicate packet transmission may include a receiving device receiving respective duplicate packets over corresponding multiple wireless links from a transmitting device, the receiving device generating synchronization information corresponding to a timing difference between the multiple wireless links, based at least on respective receive timings of the respective duplicate packets, and the receiving device transmitting the synchronization information to the transmitting device. The method may further include the transmitting device controlling delivery timing of future respective duplicate packets to the multiple wireless links for transmission to the receiving device, based on the synchronization information. Reception of the respective duplicate packets over the multiple wireless links may be part of operating in carrier aggregation mode or dual connectivity mode.

Generating the synchronization information may include measuring a time difference between reception of a first packet over a first wireless link and a second packet over a second wireless link, with the first packet and the second packet having identical sequence numbers associated with a first protocol layer, e.g. associated with the PDCP layer. In some embodiments, generating the synchronization information may include, for each packet of a group of duplicate packets having identical sequence numbers, determining a timing difference between the receive time of the packet and respective receive times of other packets of the group of duplicate packets. The synchronization information may be transmitted via one or more of, but not limited to, a PDCP PDU, and RLC PDU, a MAC control element, and/or radio resource control signaling.

In some embodiments, the synchronization information may include one or more of, but no limited to, a largest and/or a smallest timing difference between receptions, over the multiple wireless links within a specified time duration, of respective packets having identical sequence numbers, a record of respective timing differences between receptions, over the multiple wireless links within the specified time duration, of the respective packets having identical sequence numbers, and/or a record of an average timing difference based on the respective timing differences.

The synchronization information may be transmitted periodically and/or in response to a trigger event. The trigger event may include one or more of, but not limited to, reception, by the receiving device, of a duplicate packet outside a specified receive window, a difference between respective receive times of respective packets having identical sequence numbers exceeding a specified time duration, and/or a request for the synchronization information by the transmitter. In some embodiments, controlling the delivery timing of the future respective duplicate packets may include delivering given packets having identical sequence numbers to the multiple wireless links within a specified time duration, and/or not delivering a first packet of the given packets to a corresponding first wireless link in response to a time difference between a first point in time, at which a second packet was delivered to a corresponding second wireless link, and a second point in time, at which the first packet is ready to be delivered to the first wireless link, exceeds a specified time duration. The specified time duration may be one or more of, but not limited to, a same duration as a packet data convergence protocol discard timer, a time duration configured via radio resource control signaling, and/or a preconfigured time duration based on quality of service type.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for synchronizing multiple wireless links used for duplicate packet transmission, the method comprising:
   transmitting, by a transmitter, multiple packets that are duplicate packets to a receiver over at least two wireless links;
   receiving synchronization information corresponding to a timing difference between the two wireless links, wherein the synchronization information is based at least on respective receive timings of the multiple packets over the two wireless links at the receiver; and
   controlling delivery timing of future respective multiple packets that are duplicate packets for transmission to the receiver over the two wireless links, based on the synchronization information.

2. The method of claim 1, wherein the respective multiple packets are transmitted and received over the two wireless links as part of operating in one of:
   carrier aggregation mode; or
   dual connectivity mode.

3. The method of claim 1, wherein the synchronization information is generated based on:
   a time difference, at the receiver, between reception of:
      a first packet of the respective multiple packets over a first wireless link of the two wireless links; and
      a second packet of the respective multiple packets over a second wireless link of the two wireless links;
   wherein the first packet and the second packet have identical sequence numbers associated with a first protocol layer.

4. The method of claim 1, wherein the synchronization information is generated based on:
   respective timing differences between a respective receive time of each packet of a group of duplicate packets of the respective multiple packets having identical sequence numbers associated with a first protocol layer, and respective receive times of other packets.

5. The method of claim 1, wherein receiving the synchronization information comprises receiving the synchronization information via one or more of the following:
   a packet data convergence protocol (PDCP) packet data unit (PDU);
   a radio link control (RLC) PDU;
   a media access control (MAC) control element (CE); or
   radio resource control signaling.

6. The method of claim 1, wherein the synchronization information comprises one or more of the following:
   a largest timing difference between respective receptions, over the two wireless links at the receiver within a specified time duration, of respective packets of the respective multiple packets having identical sequence numbers associated with a first protocol layer;
   a smallest timing difference between respective receptions, over the two wireless links at the receiver within the specified time duration, of the respective packets having identical sequence numbers associated with the first protocol layer;
   a record of respective timing differences between respective receptions, over the two wireless links at the receiver within the specified time duration, of the respective packets having identical sequence numbers associated with the first protocol layer; or
   a record of an average timing difference based on the respective timing differences.

7. The method of claim 1, wherein receiving the synchronization information comprises receiving the synchronization information periodically.

8. The method of claim 1, wherein receiving the synchronization information comprises receiving the synchronization information in response to a trigger event.

9. The method of claim 8, wherein the trigger event comprises one or more of the following:
   reception, at the receiver, of a duplicate packet of the respective multiple packets outside a specified receive window;
   a difference between respective receive times of respective packets of the respective multiple packets having identical sequence numbers associated with a first protocol layer exceeding a specified time duration; or
   a request for the synchronization information.

10. The method of claim 1, wherein controlling the delivery timing of the future respective multiple packets comprises one or more of the following:
    delivering given packets of the future respective multiple packets having identical sequence numbers associated with a first protocol layer to the two wireless links within a specified time duration; or
    not delivering a first packet of the given packets to a corresponding first wireless link of the two wireless links in response to a time difference between a first point in time, at which a second packet was delivered to a corresponding second wireless link of the two wireless links, and a second point in time, at which the first packet is ready to be delivered to the first wireless link, exceeds a specified time duration.

11. The method of claim 10, wherein the specified time duration comprises one or more of the following:
    a same duration as a packet data convergence protocol discard timer;
    a time duration configured via radio resource control signaling; or
    a preconfigured time duration based on quality of service type.

12. An apparatus comprising:
    a processor configured to:
       have multiple packets that are duplicate packets transmitted to a receiver over at least two wireless links;
       receive synchronization information corresponding to a timing difference between the two wireless links, wherein the synchronization information is based at least on respective receive timings of the multiple packets over the two wireless links at the receiver; and
       control delivery timing of future respective multiple packets that are duplicate packets for transmission to the receiver over the two wireless links, based on the synchronization information.

13. The apparatus of claim 12, wherein the synchronization information is generated based on:
    respective timing differences between a respective receive time of each packet of a group of duplicate packets of the respective multiple packets having identical sequence numbers associated with a first protocol layer, and respective receive times of other packets.

14. The apparatus of claim 12, wherein the processor is further configured to receive the synchronization information via one or more of the following:
- a packet data convergence protocol (PDCP) packet data unit (PDU);
- a radio link control (RLC) PDU;
- a media access control (MAC) control element (CE); or
- radio resource control signaling.

15. The apparatus of claim 12, wherein the synchronization information comprises one or more of the following:
- a largest timing difference between respective receptions, over the two wireless links at the receiver within a specified time duration, of respective packets of the respective multiple packets having identical sequence numbers associated with a packet data convergence protocol (PDCP);
- a smallest timing difference between respective receptions, over the two wireless links at the receiver within the specified time duration, of the respective packets having identical sequence numbers associated with the PDCP;
- a record of respective timing differences between respective receptions, over the two wireless links at the receiver within the specified time duration, of the respective packets having identical sequence numbers associated with the PDCP; or
- a record of an average timing difference based on the respective timing differences.

16. The apparatus of claim 12, wherein the processor is further configured to:
- receive the synchronization information periodically; or
- receive the synchronization information in response to a trigger event, wherein the trigger event comprises one or more of the following:
  - reception, at the receiver, of a duplicate packet of the respective multiple packets outside a specified receive window;
  - a difference between respective receive times of respective packets of the respective multiple packets having identical sequence numbers associated with a packet data convergence protocol exceeding a specified time duration; or
  - a request for the synchronization information.

17. A device comprising:
- radio circuitry configured to facilitate wireless communications of the device over a wireless network; and
- a processor communicatively coupled to the radio circuitry and configured to interoperate with the radio circuitry to:
  - transmit multiple packets that are duplicate packets to a receiver over at least two wireless links;
  - receive synchronization information corresponding to a timing difference between the two wireless links, wherein the synchronization information is based at least on respective receive timings of the multiple packets over the two wireless links at the receiver; and
  - control delivery timing of future respective multiple packets that are duplicate packets for transmission to the receiver over the two wireless links, based on the synchronization information.

18. The device of claim 17, wherein the synchronization information is generated based on:
- respective timing differences between a respective receive time of each packet of a group of duplicate packets of the respective multiple packets having identical sequence numbers associated with a first protocol layer, and respective receive times of other packets.

19. The device of claim 17, wherein the synchronization information comprises one or more of the following:
- a largest timing difference between respective receptions, over the two wireless links at the receiver within a specified time duration, of respective packets of the respective multiple packets having identical sequence numbers associated with a packet data convergence protocol (PDCP);
- a smallest timing difference between respective receptions, over the two wireless links at the receiver within the specified time duration, of the respective packets having identical sequence numbers associated with the PDCP;
- a record of respective timing differences between respective receptions, over the two wireless links at the receiver within the specified time duration, of the respective packets having identical sequence numbers associated with the PDCP; or
- a record of an average timing difference based on the respective timing differences.

20. The device of claim 17, wherein the processor is configured to further interoperate with the radio circuitry to perform one or more of the following:
- receive the synchronization information periodically; or
- receive the synchronization information in response to a trigger event, wherein the trigger event comprises one or more of the following:
  - reception, at the receiver, of a duplicate packet of the respective multiple packets outside a specified receive window;
  - a difference between respective receive times of respective packets of the respective multiple packets having identical sequence numbers associated with a packet data convergence protocol exceeding a specified time duration; or
  - a request for the synchronization information.

* * * * *